(12) United States Patent
Mukhopadhyay et al.

(10) Patent No.: US 7,814,548 B2
(45) Date of Patent: Oct. 12, 2010

(54) INSTANCE BASED LEARNING FRAMEWORK FOR EFFECTIVE BEHAVIOR PROFILING AND ANOMALY INTRUSION DETECTION

(75) Inventors: Debapriyay Mukhopadhyay, West Bengal (IN); Satyajit Banerjee, West Bengal (IN)

(73) Assignee: Honeywell International Inc., Morristown, NJ (US)

( * ) Notice: Subject to any disclaimer, the term of this patent is extended or adjusted under 35 U.S.C. 154(b) by 1122 days.

(21) Appl. No.: 11/224,880

(22) Filed: Sep. 13, 2005

(65) Prior Publication Data

US 2007/0061882 A1   Mar. 15, 2007

(51) Int. Cl.
*G06F 21/00* (2006.01)
(52) U.S. Cl. .......................................... 726/24; 726/23
(58) Field of Classification Search .................. 726/23, 726/24
See application file for complete search history.

(56) References Cited

U.S. PATENT DOCUMENTS

| | | | |
|---|---|---|---|
| 5,271,411 A * | 12/1993 | Ripley et al. ................. | 600/515 |
| 6,405,318 B1 | 6/2002 | Rowland | |
| 6,671,811 B1 | 12/2003 | Diep et al. | |
| 6,742,124 B1 | 5/2004 | Kilpatrick et al. | |
| 6,769,066 B1 | 7/2004 | Botros et al. | |
| 7,290,281 B1 * | 10/2007 | McGrew ...................... | 726/23 |
| 2002/0138755 A1 | 9/2002 | Ko | |
| 2004/0025044 A1 | 2/2004 | Day | |
| 2004/0054505 A1 | 3/2004 | Lee | |
| 2004/0059947 A1 | 3/2004 | Lee | |
| 2004/0098617 A1 | 5/2004 | Sekar | |
| 2004/0139353 A1 | 7/2004 | Forcade | |
| 2004/0143756 A1 | 7/2004 | Munson | |
| 2004/0221178 A1 | 11/2004 | Aaron et al. | |
| 2004/0225627 A1 | 11/2004 | Botros et al. | |
| 2004/0230834 A1 | 11/2004 | McCallam | |
| 2004/0255157 A1 | 12/2004 | Ghanea-Hercock | |
| 2004/0260945 A1 | 12/2004 | Raikar et al. | |
| 2005/0005031 A1 | 1/2005 | Gordy et al. | |

(Continued)

FOREIGN PATENT DOCUMENTS

EP   0 985 995 B1   3/2000

(Continued)

OTHER PUBLICATIONS

D. Denning, "An Intrusion-Detection Model", IEEE Transactions of Software Engineering, vol. Se-13, No. 2, Feb. 1987, pp. 1-17.

(Continued)

*Primary Examiner*—Nasser Moazzami
*Assistant Examiner*—Lisa Lewis
(74) *Attorney, Agent, or Firm*—Kermit D. Lopez; Luis M. Ortiz; Tuesday A. Kaasch

(57) ABSTRACT

Intruders into a computer are detected by capturing historical data input into the computer by a user during a training mode, by profiling the historical data during the training mode to identify normal behavior, by capturing test data input by the user into the computer during an operational mode, by comparing the test data with the profiled historical data in accordance with a predetermined similarity metric during the operational mode to produce similarity results, and by evaluating the similarity results during the operational mode to identify abnormal data.

21 Claims, 8 Drawing Sheets

U.S. PATENT DOCUMENTS

| | | |
|---|---|---|
| 2005/0022003 A1 | 1/2005 | Oliphant |
| 2005/0022018 A1 | 1/2005 | Szor |
| 2005/0022022 A1 | 1/2005 | Mendonca et al. |
| 2006/0282457 A1* | 12/2006 | Williams .................... 707/102 |

FOREIGN PATENT DOCUMENTS

| | | |
|---|---|---|
| WO | WO 01/84285 A2 | 11/2001 |
| WO | WO 03/067847 A2 | 8/2003 |
| WO | WO 03/067847 A3 | 8/2003 |

OTHER PUBLICATIONS

Kumar et al., "A Pattern Matching Model for Misuse Intrusion Detection", In NIST (Ed.), Proceedings of the 17th National Institute of Standards and Technology (NIST), Baltimore, MD, 1994.

T. Lane et al., "Sequence Matching and Learning in Anomaly Detection for Computer Security", Proceedings of AAAl—97 Workshop on Al approaches to Fraud Detection and Risk Management (1997).

J. Ryan et al., "Intrusion Detection with Neural Networks", Advances in Neural Information Processing Systems, (1998).

T. Lane et al., "Temporal Sequence Learning and Data Reduction for Anomaly Detection", in L. Gong/& M. Reiter (Eds.), Proceedings of 5th Conference on Computer and Communications Security, ACM Press, New York, NY (1998).

S. Axelsson, "Research in Intrusion-Detection Systems: A Survey", Technical Report TR98-17 (1999).

S.M. Emran et al., "Robustness of Canberra Metric in Computer Intrusion Detection", Proceedings of the IEEE workshop on Information Assurance and Security (2001).

D. Barbara et al., "ADAM: A Testbed for Exploring the Use of Data Mining in Intrusion Detection", ACM SIGMOD Record (2001), pp. 15-24.

M. Botha et al., "The Utilization of Artificial Intelligence in a Hybrid Intrusion Detection System", Proceedings of SAICSIT (2002), pp. 149-155.

P. Ning et al., "Intrusion Detection Techniques", In H. Bidgoli (Ed.), The Internet Encyclopedia, John Wiley /& Sons, Dec. 2003.

H. Inoue et al., "Anomaly Intrusion Detection in Dynamic Execution Environments", In Proceedings of 2002 Workshop on New Security paradigms, pp. 52-60.

A. Seleznyov et al., "Learning Temporal Patterns for Anomaly Intrusion Detection", In Proceedings of the 2002 ACM Symposium on Applied Computing, pp. 209-213.

* cited by examiner

US 7,814,548 B2

INSTANCE BASED LEARNING FRAMEWORK FOR EFFECTIVE BEHAVIOR PROFILING AND ANOMALY INTRUSION DETECTION

TECHNICAL FIELD OF THE INVENTION

The present invention relates to a system that implements instance based learning for effective behavior profiling and detection of intrusion anomalies.

BACKGROUND OF THE INVENTION

Intrusion into a system such as an information system can be defined as one or more unauthorized activities that violate the security policy applicable to the system. The detection of an intrusion is the act of tracing those unauthorized activities (or users) in the system. Intrusion detection relies on the belief that an intruder's behavior will be noticeably different from that of a legitimate user and that unauthorized actions, therefore, are detectable. Thus, intrusion detection should provide an in-depth defense against intrusion into the system by checking and rechecking the effectiveness of other access control mechanisms of the system.

The main goal of intrusion detection is to effectively monitor the events occurring in a host machine or network for signs of intrusion and to report the signs of intrusion to a system administrator so that the system administrator can take appropriate remedial and/or preventative actions.

Generally, the detection of intrusions can be classified into two categories, misuse detection and anomaly detection, depending on how the monitored data is evaluated. In misuse detection, information about previous attacks is used to generate attack signatures that can be compared to current activity data in order to determine if the current activity data indicates an intrusion. In anomaly detection, the normal behavior of the system is learned, and any activity that strongly deviates from the learned normal behavioral profile is considered an intrusion.

One of the problems with anomaly intrusion detection is that it is difficult to learn intrusion behavior from discrete data. Unfortunately, the success of an intrusion detection is mainly dependent on how efficiently the audited data can be analyzed for traces of intrusion.

An instance based learning model can be used to classify query data (i.e., query instance) according to the relationship between the query instance and stored exemplar instances. Instance based learning requires a notion of how the similarity between two discrete data sequences can be measured in order to classify the query instance.

The similarity measure proposed by Lane and Brodley in "Temporal Sequence Learning and Data Reduction for Anomaly Detection," Proceedings of the 5$^{th}$ Conference on Computer and Communication Security, ACM Press, New York, N.Y., is a useful similarity metric. According to this similarity metric, the similarity between two discrete valued sequences X and Y of fixed length n defined as $X=(x_0, x_1, \ldots, x_{n-1})$ and $Y=(y_0, y_1, \ldots, y_{n-1})$ is given by the following pair of functions:

$$W(X, Y, k) = \begin{cases} 0 & \text{if } k<0 \text{ or } x_k \neq y_k \\ 1 + W(X, Y, k-1) & \text{if } x_k = y_k \end{cases}$$

and $$SIM(X, Y) = \sum_{k=0}^{n-1} W(X, Y, k)$$

As can be seen from the above functions, the similarity score between two instances X and Y that are exactly the same is a maximum and has a value of $n(n+1)/2$. This maximum similarity score is denoted $Sim_{max}$. A lower bound on the similarity score when there is exactly one unmatched position between any pair of instances X and Y is given by the following function:

$$Lb_n^1 = \begin{cases} \left(\left\lceil \frac{n-1}{2} \right\rceil\right)^2 & \text{if } n \text{ is even} \\ \frac{n^2-1}{4} & \text{if } n \text{ is odd} \end{cases}$$

The converse measurement, i.e., distance, between the sequences X and Y is given by $Dist(X,Y)=Sim_{max}-Sim(X,Y)$.

In the context of anomaly detection, user behavior or system behavior is profiled. However, these behavioral profiles can, potentially, grow without bound. Therefore, data reduction is important because the size of the profile directly impacts the time required for classification of a test instance as normal or an anomaly. The behavioral profile of the user/network is required to be present in main memory for real time detection of intrusive activities to be possible. Accordingly, a major challenge in designing an intrusion detection system is to make sure that these behavioral profiles do not consume huge amounts of space in the primary memory, or otherwise normal activities of the user/network will be impaired.

The present invention is directed to an intrusion detection system that detects anomalies and that addresses one or more of these or other problems.

SUMMARY OF THE INVENTION

In accordance with one aspect of the present invention, a computer implemented method for detecting intruders into a computer comprises the following: capturing historical data input into the computer by a user during a training mode; profiling the historical data during the training mode to identify normal behavior; capturing test data input by the user into the computer during an operational mode; comparing the test data with the profiled historical data in accordance with a predetermined similarity metric during the operational mode to produce similarity results; and, evaluating the similarity results during the operational mode to identify abnormal data.

In accordance with another aspect of the present invention, a computer implemented method for detecting intruders into a computer system comprises the following: establishing clusters of training data input into the computer system by a user during a training mode, wherein each cluster includes a representative instance, a frequency associated with the representative instance, and pointers that point to a list of non-representative instances whose similarity scores with the representative instance is above a predetermined threshold, and wherein the similarity scores are based on a predetermined similarity metric; comparing test data with the representative instances of the clusters in accordance with the predetermined similarity metric during an operational mode to produce similarity results, wherein the test data is input by the user into the computer system; and, evaluating the similarity results during the operational mode to identify intrusions.

In accordance with still another aspect of the present invention, a computer implemented method for detecting intruders into a computer system comprises the following: capturing first data input into the computer system; establishing clusters of the first data, wherein each cluster includes a representative instance, a frequency associated with the representative instance, and pointers that point to a list of non-representative instances whose similarity scores with the representative instance are within a predetermined range, and wherein the similarity scores are based on a predetermined similarity metric; capturing second data input into the computer system; comparing the second data with the representative instances in accordance with the predetermined similarity metric to produce similarity results; and, evaluating the similarity results to identify abnormal data.

BRIEF DESCRIPTION OF THE DRAWING

These and other features and advantages will become more apparent from a detailed consideration of the invention when taken in conjunction with the drawings in which.

DETAILED DESCRIPTION

Figure 1:
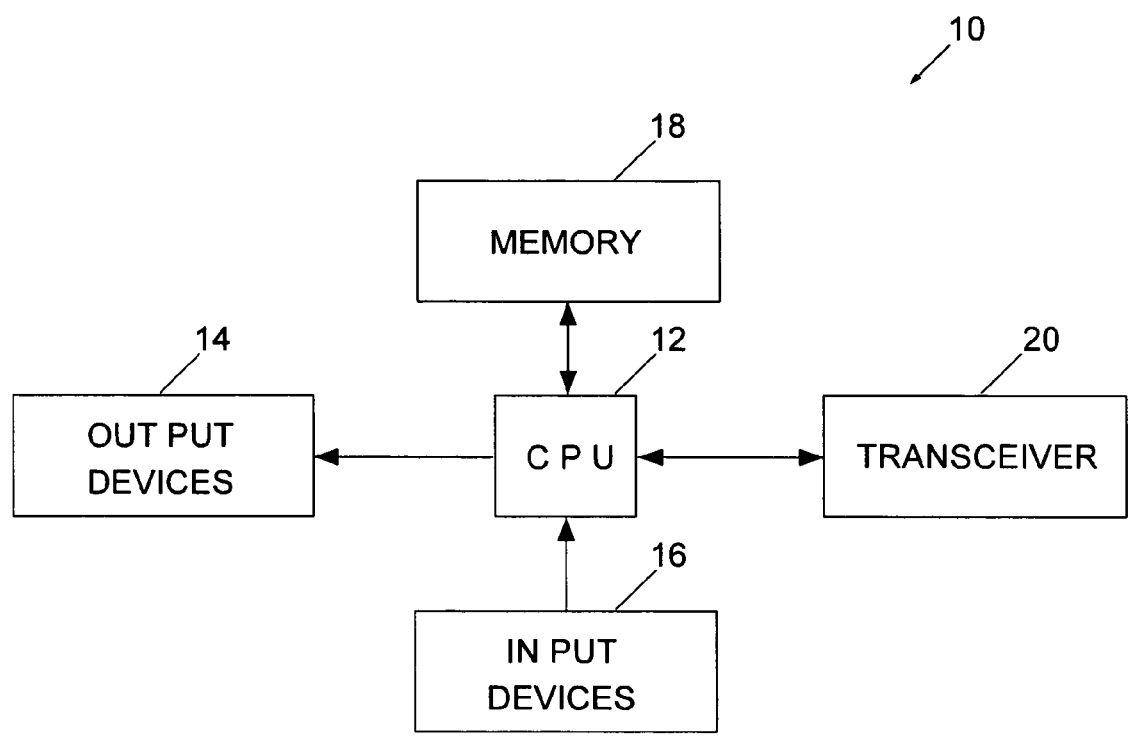
FIG. 1 illustrates an example device 10 suitable for implementing the present invention.

The present invention can be implemented in the context of a processor, work station, or other device 10 having an example construction such as that shown in FIG. 1. The example device 10 includes a processor 12, such as a CPU, coupled to output devices 14, input devices 16, and a memory 18. The output devices 14, for example, may include a printer, an alarm or other system administrator alert, and/or display so that the user can view the outputs of the example device 10 and so that the system administrator can be notified of possible intrusions. The input devices 16, for example, may include a keyboard and/or mouse so that the user can input data and instructions to the example device 10. The memory 18 stores programs and data at least some of which may be the data structure and clustering algorithm described below. The example device 10 may further include a transceiver 20 such as a modem, network interface, or other device that permits the example device 10 to communicate with other devices through an intranet, internet, or otherwise. The intrusion alerts can be provided to the system administrator by use of the transceiver 20.

As suggested above, the example device 10 may have other constructions and may have additional and/or other input and/or output devices than those described above.

As also suggested above, the example device 10 can be a user terminal in a network such as a local area network or a wide area network. The example device 10 and some or all of the other user terminals in the network may include a data structure and a clustering algorithm as described below so that each terminal monitors the activities of its user in order to detect anomalies.

Alternatively, in some networks, it may be desirable to provide a single user terminal or non-user terminal that includes a data structure and a clustering algorithm as described below so that all user activities in the network are monitored by the single terminal in order to detect network wide anomalies. Other variations are also possible.

In one embodiment of the present invention, an instance based learning framework provided by the data structure and clustering algorithm develops a user behavior profile and compares observed user behavior with the profile in order to classify the user behavior as an anomaly and, therefore, a possible intrusion. In order to assist in user behavior profiling, the instance based learning framework uses the data structure, which may be a single data structure, and the clustering algorithm that populates the data structure with data. This instance based learning framework also addresses the problem of data reduction and the periodic updating of the behavioral profile to thereby eliminate the need of a multi-agent based architecture for anomaly intrusion detection. Another advantage of the instance based learning framework is that it addresses the problem relating of memory utilization through instance compression.

In order to enable intrusion detection based on anomalous behavior, a profile of a user's normal behavior is first created during a training mode. UNIX shell command traces can be used to profile a behavior by converting streams of shell command traces into a set of fixed length instances of temporally adjacent user actions. The raw stream of shell command traces is partitioned so that every position i of the event stream is considered as a starting point for an instance of length n. The instance of length n starting at position i in the raw stream is referred to as the instance with time stamp value equal to i. All such instances are collected over a period of time to form the training data required to profile the user's normal behavior. This profiling is performed through use of the data structure and the clustering algorithm described below.

As an example of partitioning, let x1, x2, x3, x4, x5, x6, . . . be a command trace generated by a user during a session, and let n=5 so that the length of each instance is 5. Then, the command trace is partitioned so that (x1, x2, x3, x4, x5) is the instance with time stamp value=1, (x2, x3, x4, x5, x6) is the instance with time stamp value=2, and so on. Accordingly, the raw stream of shell command traces is typically partitioned to generate several instances.

The data structure is a list of tables, where each table in the list has a size M defined by the following equation:

$$M = \lceil \frac{n}{2} \rceil + 1$$

where n is the length of each of the instances that are used to populate the tables in the list, and where M defines the number of entries or rows in each of the tables.

Figure 2:
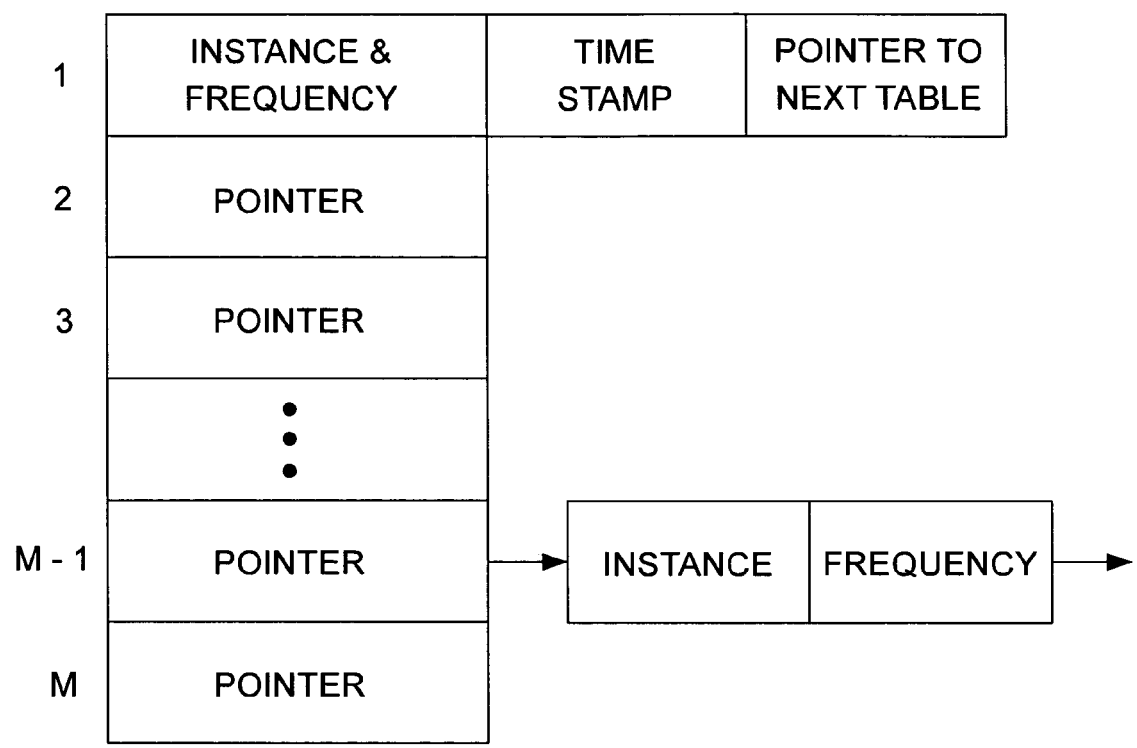
FIG. 2 illustrates an example table useful in describing a data structure maintained by the example device of FIG. 1.

An example table is shown in FIG. 2. The first entry in the table has fields to accommodate a representative instance and the frequency of that representative instance in the training data. The first entry also contains two other fields—one to store a time stamp value, and the other to store a pointer to the next table in the list. All other remaining entries in a table contain a pointer pointing to the head of a list of exemplar instances. These exemplar instances are mapped to the table by a hash function. For example, at entry M−1, a pointer points to the head of a list of exemplar instances. The instance, frequency block shown in FIG. 2 is the head node of the list of exemplar instances, and the address of this node is stored as the pointer in the (M−1)$^{th}$ entry in the table. This block in turn points to another block of the same type.

Each instance is a vector of fixed length n. The first entry in the table contains the representative instance $X=(x_0, x_1, x_2, \ldots, x_{(n-1)})$. Assume that another instance Y is to be added to the same table. The similarity k1 between X and Y is calculated as k1=Sim(X,Y). The hash value for Y is computed as follows. The minimum non-negative root of the equation r(n−r+1)=n(n+1)/2−k1 is found and is denoted by t. The hash value h(k1) is assigned the value round(t)+1, where round(t) rounds t to the closest integer. Instance Y is then be added to the list of exemplar instances and is accessible by a pointer that is stored in the h(k1)$^{th}$ entry of the table. This process is also discussed below.

The instance in the first entry of a table is referred to as the representative instance (R) of that table and is representative of all other instances to which the pointers in that table point.

As discussed above, the hash function h which maps an instance into a particular entry of a table is given by h(k) =round(t)+1, where t is the minimum non-negative root in r of the following equation:

$$r(n - r + 1) = \frac{n(n + 1)}{2} - k \quad (1)$$

where k is the similarity score between that instance and the representative instance R of a table. If k=$Sim_{max}$, for example, then equation (1) becomes simply r(n−r+1)=0, since $Sim_{max}$=n(n+1)/2. Therefore, the root r has two values, 0 and n+1. The value t is assigned the value 0 because, out of the two roots, the root 0 is the minimum non-negative root. Hence, h($Sim_{max}$)=round(0)+1=1.

The tables in the data structure can be populated with data by a process referred to herein as clustering. A cluster is usually represented by a single exemplar instance, which is the instance having the smallest distance from all other instances in the cluster. However, in the clustering process described herein, such a representative instance of a cluster is not determined. Rather, distinct instances are grouped to form clusters depending on their similarity values.

The criterion that is used to cluster instances X and Y together in the same cluster is to determine a representative instance R that satisfies two conditions. The first condition is that both the Sim(X,R) and Sim(Y,R) fall in the interval I defined as follows:

$$I = \left[ Lb_n^1, \frac{n(n+1)}{2} \right].$$

The second condition is that Sim(X,R)≧Sim(X,R') and Sim(Y,R)≧Sim(Y,R') for all R' for which the first condition (i) is satisfied. For each distinct instance captured during the training mode, a single copy will be retained along with its frequency in the training data. Again, for similarities k∈I, the roots of equation (1) are always real and non-negative, and h(k)∈{1, ..., M}. The clustering algorithm described below centers around the observation that the instances whose similarity scores with R are in the interval I will form a cluster. Hence, a set of instances, which can be accessed via a particular table, have their similarity scores with the representative instance R of that table in the interval I and thus forms a cluster.

The pseudo code for the clustering algorithm is as given below.

Proc Clustering

Begin
    Let Y be an instance under consideration.
    Step 1. Move through the Tables in the list by checking only the data in the first entry of each table to find a set S of instances R' such that Sim(R',Y)≧$Lb_n^1$.
    Step 2. If there is no such R', then
        Initialize a table of size M with Y in the 1st entry.
        Add this table at the end of the list of tables.
        Initialize the time stamp field by the time stamp value of the instance Y also set the frequency of this instance to 1.
    Else
        Find an instance R∈S such that SIM(Y,R)≧SIM(R',Y) ∀R'∈S.
        Update the time stamp value of the table associated with R by the time stamp value of the instance Y.
        Compute z=h(Sim(R,Y)) where the hash function h is defined above.
        Go to Step 3.
    End
    Step 3. If z=1,
        Increment the frequency of the instance in the first entry of the table for R by 1.
    Else
        Add Y in the list issued from the z$^{th}$ entry of the table for R if it is not there previously.
        Set the frequency for that instance to be equal to 1.
        If Y is already there in the list corresponding to the z$^{th}$ entry of the table for R, then increment it's frequency by 1.
    End
    Step 4. Repeat Steps 1 to 3 until all the training instances are examined.

End

End Proc

The above algorithm will output a list of tables with each distinct instance being present in only one of the tables. For each distinct instance, the algorithm also outputs the frequency of the instance in the training data (also referred to as the instance dictionary).

Figure 3A:
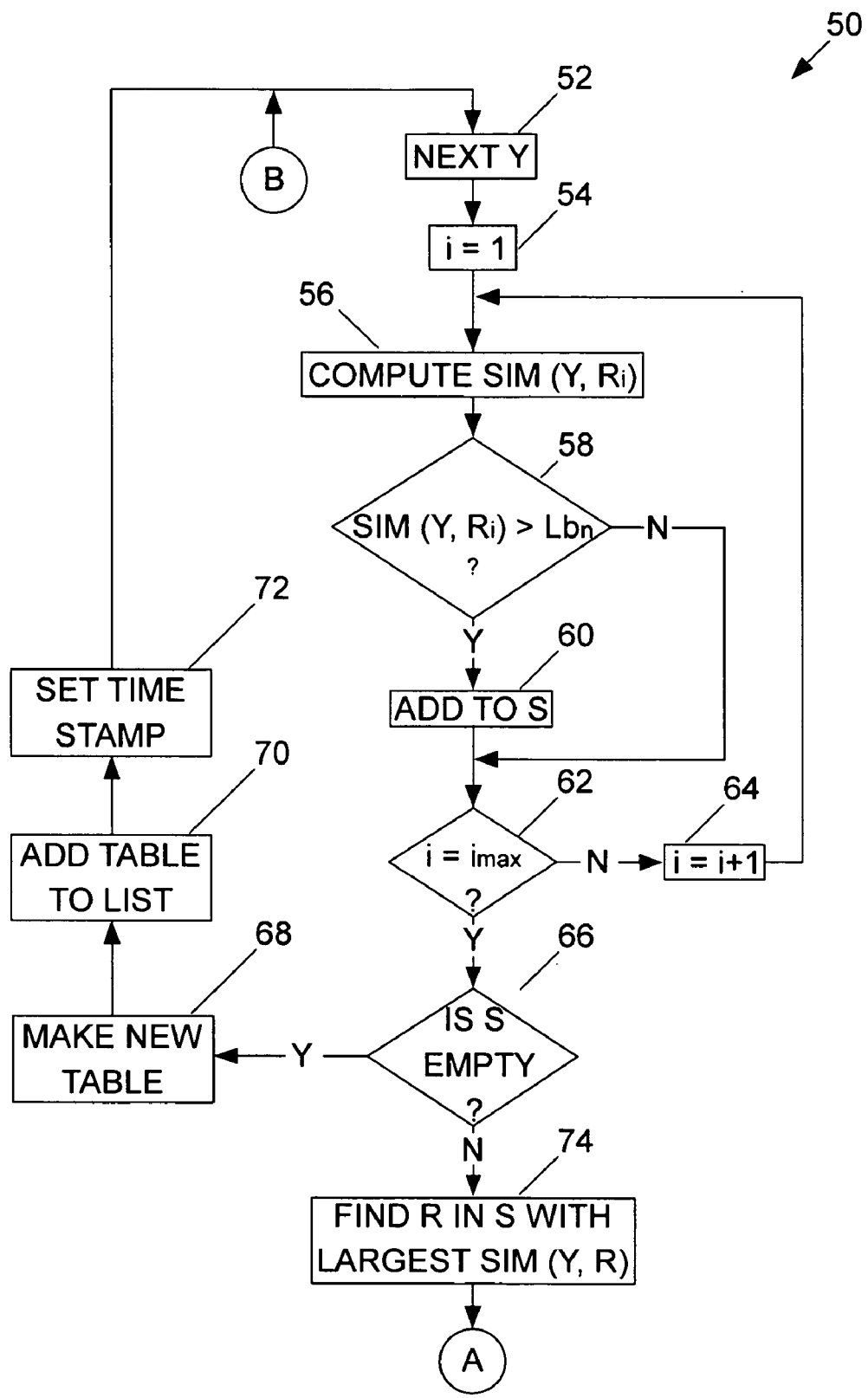
FIGS. 3A and 3B illustrate a flow chart for a clustering program that can be executed by the example device of FIG. 1.
Figure 3B:
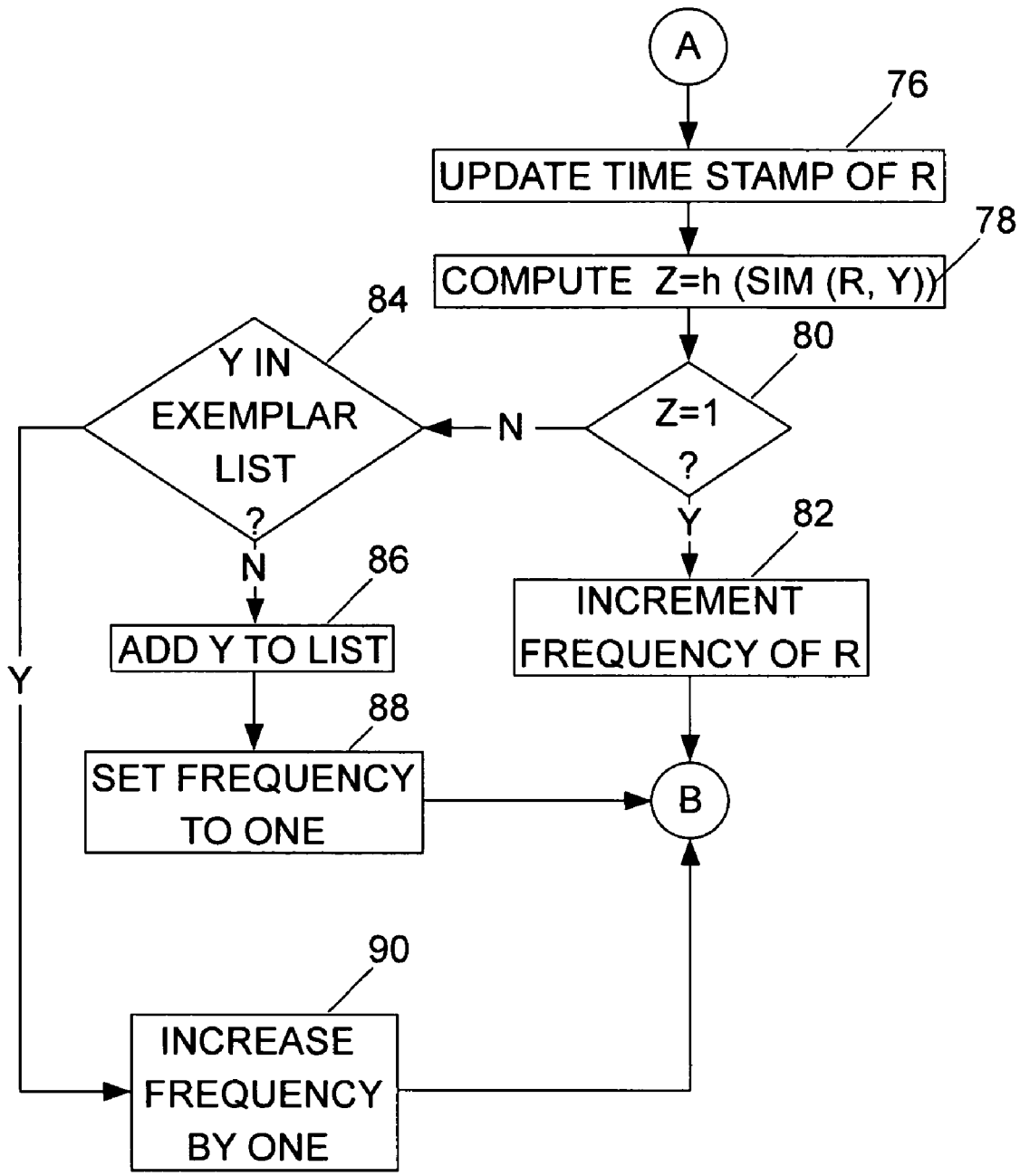

This clustering algorithm may be implemented as a program 50 which is shown by way of the flow chart of FIGS. 3A and 3B, which may be stored in the memory 18, and which may be executed by the example device 10. Accordingly, at 52, the next instance Y derived from the actions of a user is considered. At 54, a variable i is set equal to one and, at 56, the similarity between the instance Y and a representative instance $R_i$ from the Tables in the list is computed. If Sim($R_i$,Y)≧$Lb_n^1$ for instance Y as determined at 58, the representative instance $R_i$ is added to the set S at 60. After the representative instance $R_i$ is added to the set S at 60, or if Sim($R_i$,Y) <$Lb_n^1$, a test is made at 62 to determine whether all representative instances $R_i$ in the list of tables have been tested. If not, i is incremented by one at 64 and flow returns to 56.

If all representative instances $R_i$ in the list of tables have been tested, a test is made at 66 to determine whether the set S is empty. If the set S is empty, the instance Y did not compare closely enough to the representative instances $R_i$ in the current tables in the list. Therefore, a new table of size M is made at 68 with Y as its representative instance in the 1st entry of the new table, this table is added at the end of the list of tables at 70, the time stamp field is initialized by the time stamp value of the instance Y and the frequency of this instance is set to one at 72, and program flow returns to 52.

On the other hand, if the set S is not empty as determined at 66, a representative instance R is found in the set S (R∈S) at 74 such that SIM(Y,R)≧SIM(R',Y)∀R'∈S. In other words, the representative instance R producing the largest similarity score of all representative instances in the set S is found. The time stamp value of the table associated with this R is set to the time stamp value of the instance Y at 76. Also at 76, the frequency of this instance R should be set to 1. At 78, the hash value based on the similarity score between this instance Y and the representative instance R determined at 74 is computed as described above and is assigned to the variable z.

At 80, a test is made to determine if the variable z is equal to 1. If so, the instance Y is identical to the representative instance R found at 74 and the frequency for this representative instance R is incremented by one at 82. If the variable z is not equal to 1, a test is made at 84 to determine whether this instance Y is already in the list of exemplar instances corresponding to the $z^{th}$ entry of the table for R. If not, the instance Y at 86 is added to the list of exemplar instances and a pointer is entered in the $z^{th}$ entry of the table for the representative instance R found at 74 that points to head of the list. Also, at 88, the frequency for this instance Y is set equal to 1. On the other hand, if this instance Y is already in the list of exemplar instances corresponding to the $z^{th}$ entry of the table for R, then it's frequency is incremented by 1 at 90.

After processing at 82, or at 88 or at 90 is completed, program flow returns to 52 to process the next instance Y.

Each of the resulting clusters represents a specific corresponding behavioral pattern of the user. These clusters can be periodically updated by re-initiating the training mode and processing an updating set of training data by the clustering algorithm.

The resulting data structure is also of help in determining changes in behavioral profiles. It may be assumed that behavioral profiles change relatively slowly. The clustering algorithm applied on an initial set of training instances may not yield tables with all its entries filled up. However, it can be expected that, as user behavior changes over time, these unfilled entries of each table in the list will start getting filled as the clustering algorithm is applied periodically.

As indicated by the clustering algorithm, a completely new instance, which cannot be put in any of the existing tables in the list, is used to initiate a new table at the end of the list, with this instance as the representative instance R of that table.

An upper bound (Ub) may be placed on the size of the list of tables in order to place an upper limit on the size of the data structure so that memory utilization can be maintained at a reasonable level. If so, a possible strategy to determine changes in the behavioral profile is LRU (least recently used) as has been suggested by Lane and Brodley in "Temporal Sequence Learning and Data Reduction for Anomaly Detection," Proceedings of the $5^{th}$ Conference on Computer and Communication Security, ACM Press, New York, N.Y. In this context, the table with the oldest time stamp value is identified, and all instances, including the representative instance R, that can be accessed via this table are deleted. New profile data can then be made representative (R) of this table. Thus, a single data structure accounts for both storage reduction and also updating of the behavioral profile.

The following is an example of the population of tables by clustering. The list corresponding to a particular entry of a table as described above is made up of linked nodes, where each node contains a reference to the next node in the list. A linked list is considered a recursive data structure because it has a recursive definition. In addition, each node contains data. A linked list may be either empty, represented by NULL, or a node that contains data and a reference to a linked list.

As described above, the data in each node includes an instance and its corresponding frequency. Also, each node contains one pointer that points to the next node of similar kind in the list. Each node by default is initialized with its pointer field set to NULL.

Assume the following instances are in the instance dictionary: A=(x1, x2, x3, x4, x5, x6); B=(x1, x2, x3, x4, x5, y6); C=(y1, x2, x3, x4, x5, x6); D=(x1, y2, x3, x4, x5, x6); and E=(y1, y2, x3, x4, x5, x6). Each instance has six elements and, therefore, n=6. With n=6, M=4, $Lb_n^1$=9, and $Sim_{max}$=21.

In applying the clustering algorithm, instance A (as the first instance) is made the representative instance of the first table. Next, the similarity score between instance A and instance B is computed as Sim(A,B)=15 using the above equations. This similarity score is in the predetermined interval I of [9, 21]. So, using equation (1) to determine t, h(15)=round(1)+1=2, since the minimum non-negative root t in this case is equal to 1. As a result, a node in the list is created with B as the instance and with its frequency set to 1, and the address of this node is stored in the $2^{nd}$ entry of the table as a pointer.

Figure 4A:
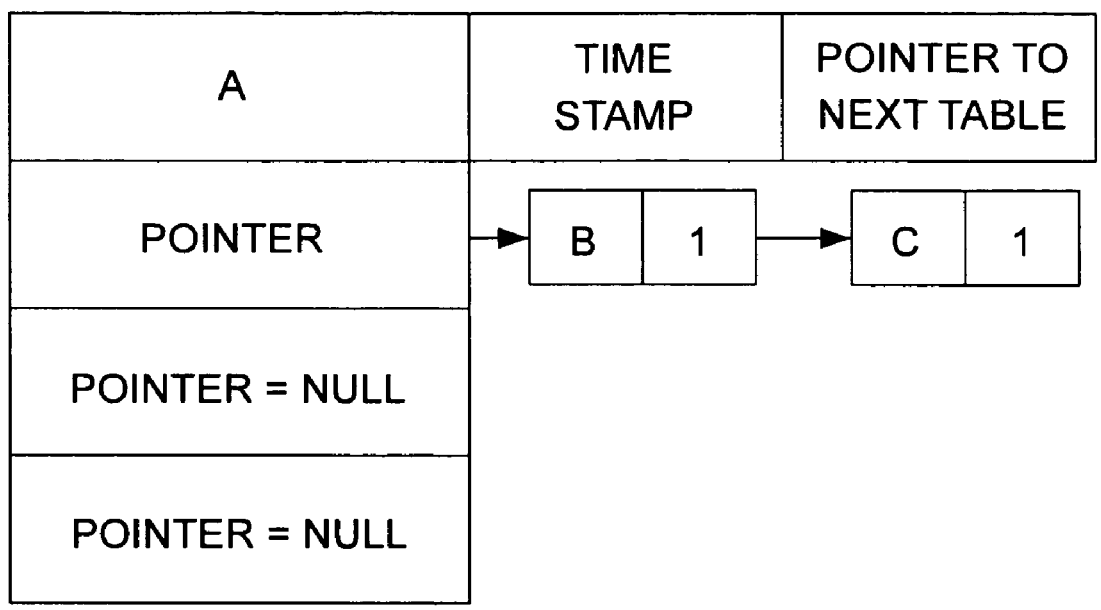
FIGS. 4A and 4B are useful in explaining data clustering and the creation of the data structure shown in FIG. 2.

Next, as there is no other table yet in the list, only the similarity score between instance A and instance C is computed as Sim(A,C)=15. This similarity score is also in the predetermined interval I of [9, 21]. Again, round(1)+1=2, since the minimum non-negative root t in this case is equal to 1. As a result, another node is created with C as the instance and with the frequency set to 1. As shown in FIG. 4A, The address of this node is stored in the reference field of the node for instance B.

In FIG. 4A, Pointer=NULL means the pointer points nothing because, at the present time, there is not yet an instance for which h(k) has a value of 3 or 4. Similarly, the node for the instance C does not contain any arrow because the instance C does not point to anything, i.e., its pointer value is NULL. Its now evident from this description that the first instance which gets mapped (by the hash function) to a particular entry of a table becomes the head node of the list and it is the address of this node which is stored as a pointer to the corresponding entry of the table. All other instances which get mapped to this entry of the table, are then added to the end of the list. In the example above, the node for instance B is the first node and becomes the head node of the corresponding list while the node for instance C is added at the end of the list.

Figure 4B:
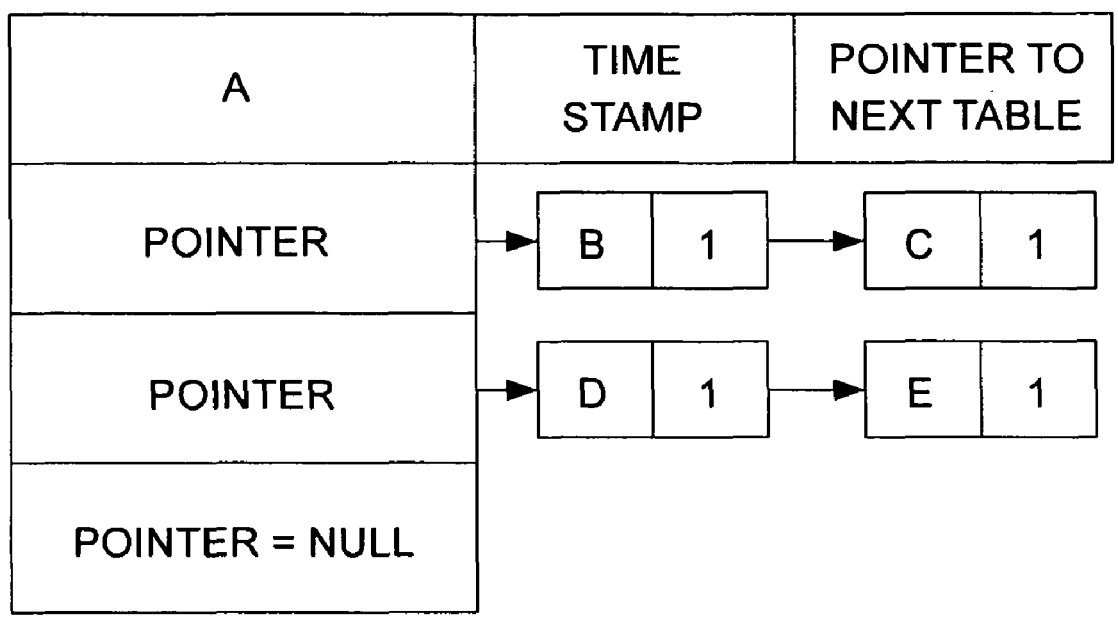

For instance D, Sim(A,D)=11 and h(11)=round(2)+1=3. Similarly, for instance E, Sim(A,E)=10 and h(10)=round(2.38)+1=3. Only the instance A is used to compute the similarity scores because, as yet, there is no other table. Since the similarity values for both these instances lie in the predetermined interval I, instances D and E are added as shown in FIG. 4B.

As indicated above and in connection with FIG. 2, the pointers of all instances for a particular entry can be stored in the entry itself. That is, the addresses of both the nodes for the instances B and C can be stored in the $2^{nd}$ entry of the table. However, a problem with this approach is that, at the time of training, the number of instances that will be mapped to a particular entry of a table is unknown. For each different entry, this number can very well be different. Therefore, the number of pointers that will be needed could vary from one entry to another and, as the number is not known beforehand, it is very difficult to allocate storage to save these pointer values in a particular entry of the table. Therefore, it is preferable to store the instances as nodes in a list and to point from these nodes to the next node in the list.

Also, as should be understood from the above description in connection with FIG. 3, if the next instance F does not produce a similarity score with instance A that is within the interval I, instance F is used to create a new table with the instance F as the representative instance of this new table. Then, for the next instance G, a first similarity score is computed between the instance G and the instance A, and a second similarity score is computed between the instance G and the instance F. If the first similarity score is within the interval I, then instance G is added to the table of instance A in the manner described above. However, if instead the second similarity score is within the interval I, then instance G is added to the table of instance B in the manner described above. But, if neither the first nor the second similarity score is within the interval I, then instance G is used to start a new table. Again, if both the first and second similarity scores are within the interval I, then the instance A or F with which similarity score is higher is found, and then the instance G is added into it's table in the manner described above.

The similarity function as described above enjoys some useful properties, and these properties can be used to address some of the relevant problems of Instance Based Learning. The goal is to establish a platform which will facilitate introduction of a new outlier detection algorithm applicable to anomaly intrusion detection during the operational mode of the present invention.

A first of the useful properties of the similarity function is that equation (1) always yields a real, non-negative root for each possible similarity score k in the interval I. In fact, the hash function $h(k)=\text{round}(t)+1$ is an onto mapping from S to $\{1, \ldots, M\}$ where $S(\subset I)$ is the collection of scores that the similarity measure can assume for two instances of length n.

This property can be proven as follows. Equation (1) can be re-written as follows:

$$r^2 - (n+1)r + d = 0, \text{ where } d = \frac{n(n+1)}{2} - k (d \geq 0 \forall k \in I)$$

The discriminant D of this equation is given by the following equation:

$$D = (n+1)^2 - 4d.$$

A careful look at the discriminant for $k \in I$ shows that the minimum value of D is either 1 or 0 depending on whether n is even or odd, which guarantees that equation (1) always yields a real root for $k \in I$. Again, since the maximum value of D is $(n+1)^2$, the fact that roots of equation (1) that are non-negative is also proven.

Let $y \in \{1, 2, \ldots, M\}$ be any integral value, and let k be given by the following equation:

$$k = \frac{(y-2)(y-1)}{2} + \frac{(n-y+1)(n-y+2)}{2}$$

If an instance X has only one mismatch with a representative instance R in the $(y-1)^{th}$ position starting from the left, then $Sim(X,R)=k \geq Lb_n{}^1$. Hence, $k \in S$. For this value of k, the roots of equation (1) in r are $(y-1)$ and $(n-y+2)$. Because $$y \leq M = \lceil \frac{n}{2} \rceil + 1 = \begin{cases} \frac{n}{2} + 1 & \text{if } n \text{ is even} \\ \frac{(n+1)}{2} + 1 & \text{if } n \text{ is odd} \end{cases}$$

then the following relationship is implied:

$$y - 1 \begin{cases} < n - y + 2 & \text{if } n \text{ is even} \\ \leq n - y + 2 & \text{if } n \text{ is odd} \end{cases}$$

So, $(y-1)$ is the minimum of the two roots of equation (1) in r and, hence, $h(k)=y$. Thus, it is proven that the hash function as described is an onto mapping from S to $\{1, 2, \ldots, M\}$.

A second of the useful properties of the similarity function is that the similarity score between two instances that have consecutive mismatches at the end or at the start of the instances is greater than the similarity score between any other pair of instances of the same length having the same number of mismatches at any position.

This property can be proven as follows. Let X be a given instance of length n. Now, for some $p \in \{1, 2, \ldots, n\}$, let Y and Z be two other instances of same length each having p mismatches with X. Let all the p mismatches of Y with X be in consecutive positions at either the start or end of the instance X, and let all of the p mismatches between Z and X be in any p positions. Then, the similarity score between X and Y is given by the following equation:

$$Sim(X, Y) = \sum_{m=1}^{n-p} m = \frac{(n-p)(n-p+1)}{2}$$

Now, p mismatches with X will divide the instance Z into (p+1) disjoint runs of consecutive matches, where the length of some of the runs can be zero. Let $l_1, l_2, \ldots, l_{p+1}$ be the lengths of these runs of consecutive matches with X such that the contribution of the $k^{th}$ run to the final similarity score is given by $$\sum_{m=0}^{l_k} m.$$

Hence, the similarity score between instance X and instance Z is given by the following equation:

$$Sim(X, Z) = \sum_{k=1}^{p+1} \left( \sum_{m=0}^{l_k} m \right)$$

such that $$\sum_{k=1}^{p+1} l_k = n - p \text{ with } 0 \le l_k \le n - p$$

Thus, n−p gives the number of positions where the elements of the instance X is same as that of the elements of the instance Z. For example, if $X=(x_0, x_1, x_2, x_3, x_4, x_5, x_6, x_7)$ and $Z=(x_0, z_1, x_2, x_3, z_4, z_5, x_6, x_7)$ (x0, z1, x2, x3, z4, z5, x6, x7) where X and Z have three mismatches at the 2nd, 5th, and 6th positions, p=3. Therefore, these 3 mismatches will divide the instance Z in to (3+1)=4 disjoint runs of consecutive matches. The value $l_k$'s represents the lengths of those consecutive matches. The sum of these lengths will be equal to n−p=8−3=5. If only one $l_k$ is non-zero and all others are zero, then Sim(X,Z)=Sim(X,Y).

Let it now be assumed that two $l_k$s are non-zero and let them be $l_i$ and $l_j$ such that $l_i \le l_j$. Because $$\sum_{m=1}^{l_i} m < \sum_{m=l_j+1}^{n-p=l_i+l_j} m$$

it follows that Sim(X,Z)<Sim(X,Y). Following a similar recursive argument, it can be inferred that Sim(X,Z)≦Sim(X,Y) for all Z with p mismatches with X.

A third of the useful properties of the similarity function is that the maximum number of mismatches that an instance can have with the representative instance R and still be in the same table with the representative instance R is given by the following expression:

$$\min_k \left\{ k : \frac{(n-k-1)(n-k)}{2} < Lb_n^1 \right\}$$

This property can be proven as follows. Let C be the maximum number of mismatches that an instance X can have with the representative instance R and still be in the same table with the representative instance R. This assumption implies that, if the instance X has (C+1) consecutive mismatches with the representative instance R either at the end or at the start of the instance X, then the instance X has a similarity score with R that is out of the region I, that is, less than the value of $Lb_n^1$. So, it now follows from the second property that C is the minimum of k such that k+1 consecutive mismatches between X and R at the end or at the start of the instance X yields a similarity score between X and R of less than $Lb_n^1$. In other words, C is given by the following expression:

$$C = \min_k \left\{ k : \sum_{m=1}^{n-(k+1)} m < Lb_n^1 \right\}$$

which computes to $$C = \min_k \left\{ k : \frac{(n-k-1)(n-k)}{2} < Lb_n^1 \right\}.$$

The similarity score of an instance X that has i(≦C) mismatches with a representative instance R either at the end or at the start of the instance X is given by the following equation:

$$Sim(X, R) = \sum_{m=1}^{n-i} m = \frac{(n-i)(n-i+1)}{2} = K_i \quad (2)$$

The interval $$I = \left[ Lb_n^1, \frac{n(n+1)}{2} \right]$$

can be partitioned into some subintervals as follows. Note that $K_1$ is an interior point in the interval I for all i=1, 2, ..., C. Letting $K_0=(n(n+1))/2$ and $K_{C+1}=Lb_n^1$, its easily observable from equation (2) that $$K_i > K_{i+1} \forall i=0, 1, \ldots, C.$$

Therefore, the interval I can be written as $I = \cup_{i=0}^{C} [K_{i+1}, K_i]$.

A definition is appropriate before the description of the fourth of the useful properties. For any two instances X and Y each of length n, a max-length-of-consecutive-matches is denoted $m_{XY}$ and is defined as the maximum length of all runs of consecutive matches between X and Y. From this definition, it follows that $m_{XY}=m_{YX}$. As for example, Sim(X,Y)=0 implies that $m_{XY}=0$, and Sim(X,Y)=(n(n+1))/2 implies that $m_{XY}=n$. Also, if $Sim(X,Y)=Lb_n^1$, then $$m_{XY} = \left\lfloor \frac{n}{2} \right\rfloor.$$

The fourth of the useful properties of the similarity function is that $m_{XR}=n-i-1$ for $9 \le n \le 18$ is a necessary and sufficient condition for an instance X to have a similarity score with R in the interval $[K_{i+1}, K_i)$ for all $1 \le i < C-1$.

This property can be proven as follows. Let it be assumed that an instance X produces a similarity score with R in the interval $[K_{i+1}, K_i)$ for any $1 \le i < C-1$. For any $1 \le i < C-1$, if the instance X is such that $m_{XR} \ge n-i$, then $Sim(X,R) \ge K_i$. Let it now be assumed that $M_{XR}=n-i-2$. Without loss of generality, it may be assumed that the first (n−i−2) positions in X have a match with R. This latter assumption implies that the (n−i−1)$^{th}$ position from the start (left end) must be a mismatch. Now, if all the remaining (i+1) positions at the right end are a match (this run of consecutive matches does not change the value of $m_{XR}$ because, for $9 \le n \le 18$ and $1 \le i < C-1$, the inequality n−i−2>i+1 always holds), then $$Sim(X, R) = \frac{(n-i-2)(n-i-1)}{2} + \frac{(i+1)(i+2)}{2} \quad (3)$$

Therefore, $$K_{i+1} - Sim(X, R) =$$

-continued
$$\frac{(n-i-1)(n-i)}{2} - \frac{(n-i-2)(n-i-1)}{2} - \frac{(i+1)(i+2)}{2} =$$
$$n - \frac{(i+1)(i+4)}{2} > 0$$

for it is verifiable that, for $n \leq 18$ and for any $1 \leq i < C-1$, $n > ((i+1)(i+4))/2$.

The similarity score given in equation (3) is an upper bound of all similarity scores for instances X in which $m_{XR} \leq n-i-2$. Hence, it follows from the description above that $m_{XR} \leq n-i-2$ implies that $Sim(X,R) < K_{i+1}$. So, for both $m_{XR} \geq n-i$ and $m_{XR} \leq n-i-2$, $Sim(X,R)$ cannot be in the interval $[K_{i+1},K_i)$ and, therefore, $m_{XR} = n-i-1$.

Conversely, an instance X such that $m_{XR} = n-i-1$ for any $1 \leq i < C-1$ can be considered. Since a run of consecutive matches of length $n-i-1$ between two instances contributes a score equal to $K_{i+1}$ to the similarity score, it therefore follows that $Sim(X,R) \geq K_{i+1}$. Following a similar reasoning as above, it can now be shown that, for any $1 \leq i < C-1$, $K_i - Sim(X,R) > 0$ for all X with $m_{XR} = n-i-1$. Accordingly, $Sim(X,R) \in [K_{i+1}, K_i)$.

For $9 \leq n \leq 18$, we have from property 3 that $3 \leq C \leq 5$. Therefore, from the fourth property as described above, the similarity that an instance X should have with a representative instance R is such that $Sim(X,R) \in [K_{i+1}, K_i)$ for all $1 \leq i < C-1$.

A fifth of the useful properties of the similarity function is that $n-C-1 \leq m_{XR} \leq n-C$ for $4 \leq n \leq 11$ and $n-C-2 \leq m_{XR} \leq n-C$ for $12 \leq n \leq 18$ are necessary conditions for an instance X to have a similarity score with R in the interval $[K_C, K_{C-1})$.

This property can be proven as follows. Let X be an instance for which $Sim(X,R) \in [K_C, K_{C-1})$. For any instance Y, $Sim(Y,R) = Lb_n^1$ implies that $$m_{YR} = \left\lfloor \frac{n}{2} \right\rfloor,$$

and also that $Lb_n^1$ upper bounds all similarity scores for all instances Y for which $$m_{YR} = \left\lfloor \frac{n}{2} \right\rfloor$$

is true. Hence, it follows that $$m_{YR} < \left\lfloor \frac{n}{2} \right\rfloor$$

implies that $Sim(Y,R) < Lb_n^1 \leq K_C$. Therefore, $$m_{XR} \geq \left\lfloor \frac{n}{2} \right\rfloor$$

and, from the fourth property described above, it follows that $m_{XR} \leq n-C$.

It may be now assumed that $$m_{XR} = n - C - k \geq \left\lfloor \frac{n}{2} \right\rfloor$$

for some $k \in N$. The upper bound of all similarity scores for all such X's for which $m_{XR} = n-C-k$ is true is given by the following expression:

$$u = \frac{(n-C-k)(n-C-k+1)}{2} + \frac{(C+k-1)(C+k)}{2}$$

Therefore $$K_C - u =$$
$$\frac{(n-C)(n-C+1)}{2} - \frac{(n-C-k)(n-C-k+1)}{2} - \frac{(C+k-1)(C+k)}{2} =$$
$$kn - \frac{C^2 + 4Ck + 2k^2 - 2k - C}{2}$$

The following table can be assembled based on the above equations:

| n | C | $K_C - u$ for k = 1 | $K_C - u$ for k = 2 | $K_C - u$ for k = 3 |
|---|---|---|---|---|
| 4 | 1 | 2 | — | — |
| 5 | 2 | 0 | — | — |
| 6 | 2 | 1 | — | — |
| 7 | 2 | 2 | 3 | — |
| 8 | 2 | 3 | 5 | — |
| 9 | 3 | 0 | 1 | — |
| 10 | 3 | 1 | 3 | — |
| 11 | 3 | 2 | 5 | 6 |
| 12 | 4 | -2 | 0 | — |
| 13 | 4 | -1 | 2 | 3 |
| 14 | 4 | 0 | 4 | 6 |
| 15 | 4 | 1 | 6 | 9 |
| 16 | 5 | -4 | 0 | 2 |
| 17 | 5 | -3 | 2 | 5 |
| 18 | 5 | -2 | 4 | 8 |

Every row in the above table can be identified by using the value of n. A "—" in a row indicates that for a value of n, the corresponding value $n-C-k$ falls below $$\left\lfloor \frac{n}{2} \right\rfloor$$

and so is ignored because only values of $K_C - u$ for $$m_{XR} = n - C - k \geq \left\lfloor \frac{n}{2} \right\rfloor$$

are of interest.

From the above table, it can be seen that all the entries in the fifth column (k=3) either are ignored or are greater than zero, while the fourth column (k=2) has zero for some values of n. An inference that can be made from this observation is that, for $4 \leq n \leq 11$, $m_{XR}$ should be greater than or equal to n−C−1 so that Sim(X,R) is in the interval $[K_C, K_{C-1})$. Similarly, it can be inferred that for $12 \leq n \leq 18$, $m_{XR}$ should be greater than or equal to n−C−2. Hence, it can be concluded that n−C−1 $\leq m_{XR} \leq$ n−C for $4 \leq n \leq 11$ and n−C−2 $\leq m_{XR} \leq$ n−C for $12 \leq n \leq 18$ are necessary conditions for an instance X to have a similarity score with R in the interval $[K_C, K_{C-1})$.

The fourth and fifth properties described above demonstrate values for $m_{XR}$ if Sim(X,R)∈$[K_{i+1}, K_i)\subseteq$I for all $1 \leq i \leq C-1$. However, the properties described above fail to demonstrate values for $m_{XR}$ if Sim(X,R)∈$[K_{C+1}, K_C)$, but $$m_{XR} \geq \left\lfloor \frac{n}{2} \right\rfloor.$$

This expression for $m_{XR}$ provides a scope for the compression of the instance X with respect to R through run length coding. Also, because of the properties described above, it is evident that compression permits at least a 50% savings of memory.

Given a query instance Q and a search distance r, a range query is defined by selecting all instances Z from the instance dictionary such that Dist(Q,Z)$\leq$r. A ball centered at Q with radius r is denoted B(Q;r) and is defined such that B(Q,r)={Z: Z is present in the instance dictionary and Dist(Q,Z)$\leq$r}.

In the application of anomaly intrusion detection, the range query has significance because, for a query instance Q (traces of shell commands), the system administrator may want to determine all instances that are within a distance r of the query instance Q. This determination helps to better analyze the query instances with respect to the user profile that has been created from the instance dictionary. The instance dictionary refers to the training data that is used to learn a profile model. In the present case, the instance dictionary (which is also referred herein as the exemplar instances) has been used to learn the normal behavioral profile of an user.

It may be thought that the number of distance computations that are required to answer any range query is equal to the size of the instance dictionary. However, the data structure proposed herein can help to answer any range query with a lesser number of distance computations because all the instances in the instance dictionary are partitioned into clusters, each cluster being represented by a representative instance R. Thus, this data structure is useful to restrict the number of distance computations. That is, those clusters for which B(Q,r) has an empty intersection is first determined. This determination requires a number of distance computations equal to the number of representative instances in the clusters. Because the clusters with which B(Q,r) has an empty intersection do not contribute any instance that answers the range query, no further distance computations are required with respect to these clusters. However, each of the clusters with which B(Q,r) has a non-empty intersection may contribute one or more instances that answer the range query. Therefore, for each of these clusters, some instances may answer the range query B(Q,r) and some may not. In order to find these instances that answer the range query, a distance calculation must be made for each instance in these clusters. Accordingly, the total number of distance computations that is required to answer a range query is the number of distinct instances present in all the clusters with which B(Q,r) has non-empty intersection. This number is greater than or equal to the number of representative instances and less than or equal to the total number of distinct instances present in the instance dictionary.

Because of the definition of cluster, if Dist(Q,R)>r+(n(n+1))/2−$Lb_n^1$, or in other words if Sim(Q,R)<$Lb_n^1$−r, then the cluster with representative instance R will have an empty intersection with B(Q,r). So, to answer a range query, all clusters whose representative instances R have a similarity score with the query instance Q that satisfies the inequality Sim(Q,R)<$Lb_n^1$−r will be discarded, thereby justifying the assertion that all query inquiries can be answered with fewer distance computations.

To classify instances through outlier detection, let T be a new command trace under test, i.e., a test instance that is evaluated during the operational mode of the present invention. This test instance T can be an instance which the system has seen previously and, if so, then the test instance T is normal data. However, if the test instance T does not produce a similarity score with the representative instance of a table in the interval I $$\left( I = \left[ Lb_n^1, \frac{n(n+1)}{2} \right] \right)$$

for any table in the list, then the test instance T is an outlier to all the clusters and hence will be considered as a possible case of intrusion.

Moreover, let the test instance T produce similarity scores in the interval I for some of the tables in the list and let these tables be denoted as $HT_1, HT_2, \ldots, HT_k$. Also, let $D_i$ be the similarity score of the test instance T with $R_i$, i.e., the representative instance of table $HT_i$. Further, let $d_i$ and $\sigma_i$ denote, respectively, the weighted mean and the standard deviation of the similarity scores between the instances in the table $HT_i$ with the representative instance $R_i$ of the table $HT_i$. By instances in the table $HT_i$, we mean those instances which can be accessed via the pointers stored in the entries of the table $HT_i$. If $D_i < d_i − \sigma_i$, for all i=1, 2, ..., k, then the example device 10 will alert the system administrator because the test instance T may be indicative of a possible intrusion. Otherwise, the test instance T will be considered normal.

Figure 5A:
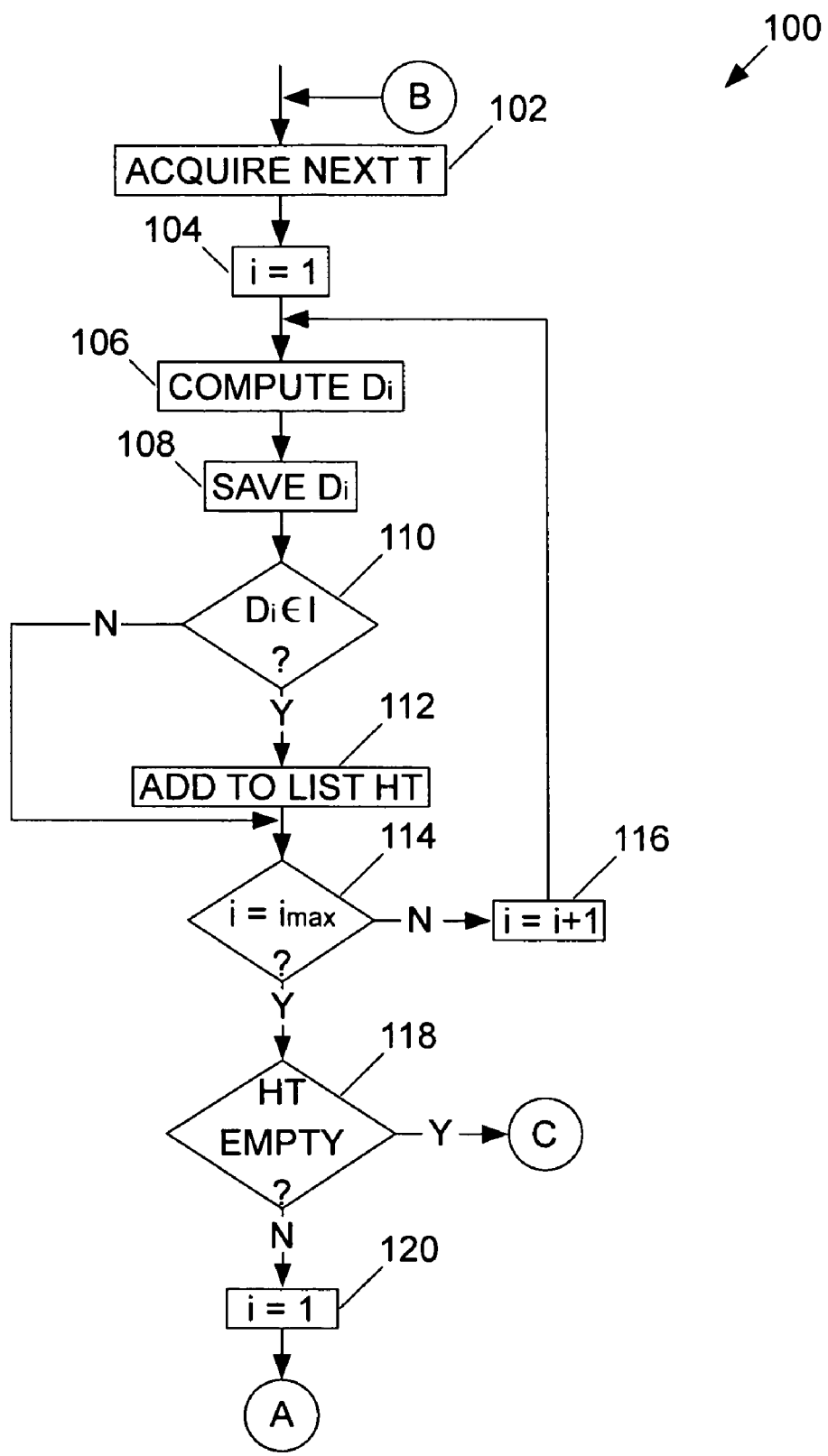
FIGS. 5A and 5B illustrate a flow chart for a program that can be executed by the example device of FIG. 1 to determine if a test instance is an outlier.
Figure 5B:
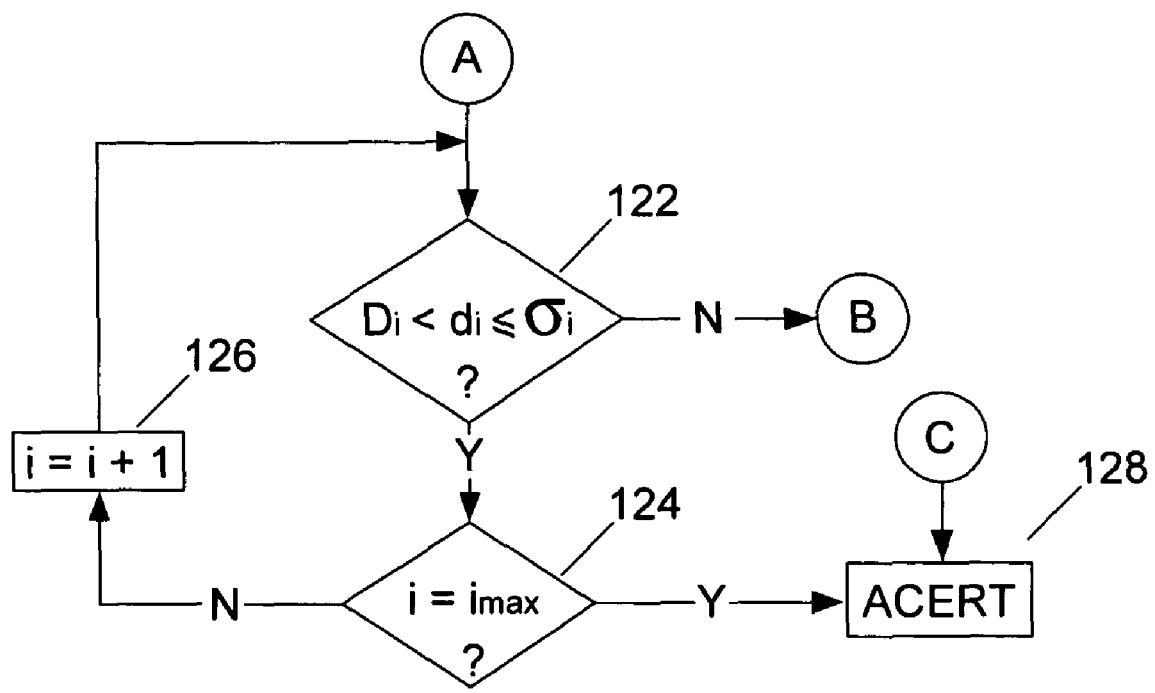

Accordingly, a program 100 shown as a flow chart in FIGS. 5A and 5B may be stored in the memory 18 and executed by the example device 10 to determine if a test instance T is an outlier. At 102, the next test instance T is acquired and, at 104, a variable i is set equal to one. At 106, the similarity score $D_i$ between the test instance T and the representative instance R of Table i is computed and, at 108, this similarity score $D_i$ is saved.

At 110, the similarity score $D_i$ is compared to the interval I defined above. If the similarity score $D_i$ is in the interval I, the Table i is added to a list HT at 112. If the similarity score $D_i$ is not in the interval I, or after the Table i is added to the list HT, i is compared to $i_{max}$, at 114. The quantity $i_{max}$ is the number of tables in the list of all tables. If i is not equal to $i_{max}$, i is incremented by one at 116 and flow returns to 106.

If i is equal to $i_{max}$, a test is made at 118 to determine if the list HT is empty. If the list HT is not empty, i is reset to one at 120. The similarity score $D_i$ is compared at 122 to the difference between the weighted mean $d_i$ and the standard deviation $\sigma_i$ relative to the $HT_i$ as defined above. If the similarity score $D_i$ is not less than the difference between the weighted mean $d_i$ and the standard deviation $\sigma_i$, then the test instance T is not an anomaly and flow returns to 102 to acquire the next test instance T. However, if the similarity score $D_i$ is less than the difference between the weighted mean $d_i$ and the standard deviation $\sigma_i$, a test is made at 124 to determine if i=$i_{max}$ where $i_{max}$ is the number tables in the list HT. If i is not equal to $i_{max}$, then i is incremented by one at 126 and the next similarity score $D_i$ is tested. If i reaches $i_{max}$, the similarity scores $D_i$ for all tables in HT are less than the difference between the weighted mean $d_i$ and the standard deviation $\sigma_i$, then the test instance T is an anomaly and the system administrator is alerted at 128. Moreover, if the list HT is empty as determined at 118, then the test instance T did not compare within the interval I to any of the representative instances of the tables on the list of tables, and the test instance T, therefore, is an outlier such that an alert is given at 128.

Certain modifications of the present invention have been discussed above. Other modifications of the present invention will occur to those practicing in the art of the present invention. For example, as described above, UNIX shell command traces are used as instances for profiling the behavior of a user or network and for determining outliers. However, shell command traces of other operating systems can be used to form instances that are useful for profiling the behavior of a user or network and for determining outliers. Moreover, data traces other than shell command traces can be used to form instances that are useful for profiling the behavior of a user or network.

Also, as described above, a training instance is an instance that is processed during the training mode, and a test instance is an instance processed during the operational mode in which outliers are detected. A query instance can be either a training sequence or a test sequence.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A computer implemented instance-based learning method for detecting intruders into a computer comprising:
   capturing historical data input into the computer by a user during a training mode;
   profiling the historical data during the training mode by converting streams of shell command traces into fixed length instances;
   profiling the fixed length instances to identify normal behavior using a single data structure and a clustering algorithm with respect to the data structure, the data structure comprising a list of tables, the tables among said list of tables having a size that is limited by an upper bound;
   determining a representative instance;
   comparing the representative instance to the fixed length instances utilizing the clustering algorithm in order to create clusters that are mapped to the tables among said list of tables;
   capturing test data input by the user into the computer during an operational mode;
   comparing the test data with the profiled historical data in accordance with a predetermined similarity metric during the operational mode to identify test data that falls outside of previously identified clusters,
   selecting dynamically a set of representative instances, wherein each of the representative instances represents a corresponding one of the clusters,
   calculating similarity scores between query instances and each of the representative instances,
   using the similarity metric, producing a real, non-negative root for each similarity score within a predefined interval,
   using each root, determining the representation in the list of tables of each respective query instance
   displaying a notification upon identifying the test data falling outside previously identified clusters.

2. The method of claim 1 wherein the profiling of the historical data further comprises updating a user behavioral profile periodically.

3. The method of claim 2 wherein the updating of the user behavioral profile periodically comprises:
   identifying an oldest cluster;
   deleting the identified cluster; and
   adding a new cluster for newly added instances of historical data.

4. The method of claim 1 further comprising
   assigning the query instance to a particular cluster if and only if the similarity score between the query instance and the particular cluster is in a predetermined range.

5. The method of claim 4 wherein the partitioning of the historical data further comprises compressing the query instance with respect to the representative instance of the particular cluster.

6. The method of claim 4 wherein the assigning of the query instance to a particular cluster comprises assigning the query instance to the particular cluster if the query instance is not identical to the representative instance of the particular cluster and otherwise incrementing a frequency count associated with the representative instance of the particular cluster.

7. The method of claim 4 wherein the assigning of the query instance to the particular cluster comprises creating a new cluster if the similarity scores between the query instance and the clusters of the set are not within the predetermined range.

8. The method of claim 1 wherein the profiling of the historical data comprises partitioning the historical data into a set of clusters such that each of the clusters represents a specific behavioral pattern of the user, wherein the comparing of the test data with the profiled historical data comprises calculating a set of similarity scores between the test data and the set of clusters in accordance with the predetermined similarity metric, and wherein the evaluating of the similarity results comprises determining a possible intrusion if each of the similarity scores is not within a predetermined range.

9. The method of claim 8 wherein the predetermined range is defined by a maximum similarity score and a lower bound of the similarity scores.

10. The method of claim 1 wherein the evaluating of the similarity results comprises identifying whether a pattern of the test data matches the profile of the historical data.

11. The method of claim 10 wherein the profiling of the historical data comprises partitioning the historical data into a set of clusters such that each of the clusters represents a specific behavioral pattern of the user, and wherein the evaluating of the similarity results comprises labeling the test data as normal if the pattern of the test data matches the profile of the historical data for at least one of the clusters and otherwise labeling the test data as intrusive.

12. The method of claim 11 wherein the comparing of the test data with the profiled historical data comprises comparing the test data with representative instances of the clusters in the set of clusters.

13. The method of claim 1 further comprising determining a set of training data falling within a predetermined range of the similarity results produced from the predetermined similarity metric.

14. A non-transitory computer-readable medium having computer-executable instructions for performing steps to detect intruders into a computer, said steps comprising:

capturing historical data input into the computer by a user during a training mode;

profiling the historical data during the training mode by converting streams of shell command traces into fixed length instances;

profiling the fixed length instances to identify normal behavior using a single data structure and a clustering algorithm with respect to the data structure, the data structure comprising a list of tables, the tables among the list of tables having a size that is limited by an upper bound;

determining a representative instance;

comparing the representative instance to the fixed length instances utilizing the clustering algorithm in order to create clusters that are mapped to the tables among said list of tables;

capturing test data input by the user into the computer during an operational mode;

comparing the test data with the profiled historical data in accordance with a predetermined similarity metric during the operational mode to test data that falls outside of previously identified clusters, selecting dynamically a set of representative instances, wherein each of the representative instances represents a corresponding one of the clusters, calculating similarity scores between query instances and each of the representative instances, using the similarity metric, producing a real, non-negative root for each similarity score within a predefined interval, using each root, determining the representation in the list of tables of each respective query instance;

wherein the profiling of the historical data further comprises updating a user behavioral profile periodically; and displaying a notification upon identifying the test data falling outside previously identified clusters.

15. The computer-readable medium claim 14 wherein the updating of the user behavioral profile periodically comprises:

identifying an oldest cluster;

deleting the identified cluster; and adding a new cluster for newly added instances of historical data.

16. The computer-readable medium of claim 14 said steps further comprising; and assigning the query instance to a particular cluster if and only if the similarity score between the query instance and the particular cluster is in a predetermined range.

17. The computer-readable medium of claim 14 wherein the profiling of the historical data comprises partitioning the historical data into a set of clusters such that each of the clusters represents a specific behavioral pattern of the user, wherein the comparing of the test data with the profiled historical data comprises calculating a set of similarity scores between the test data and the set of clusters in accordance with the predetermined similarity metric, and wherein the evaluating of the similarity results comprises determining a possible intrusion if each of the similarity scores is not within a predetermined range.

18. The computer-readable medium of claim 17 wherein the predetermined range is defined by a maximum similarity score and a lower bound of the similarity scores.

19. A computer implemented method utilizing an instance based learning framework for detecting intruders into a computer comprising:

capturing historical data input into the computer by a user during a training mode;

profiling the historical data during the training mode by converting streams of shell command traces into fixed length instances;

profiling the fixed length instances to identify normal behavior using a single data structure and a clustering algorithm with respect to the data structure, the data structure comprising a list of tables, the tables among said list of tables having a size that is limited by an upper bound;

determining a representative instance;

comparing the representative instance to the fixed length instances utilizing the clustering algorithm in order to create clusters that are mapped to the tables among said list of tables;

capturing test data input by the user into the computer during an operational mode;

comparing the test data with the profiled historical data in accordance with a predetermined similarity metric during the operational mode to test data that falls outside of previously identified clusters, selecting dynamically a set of representative instances, wherein each of the representative instances represents a corresponding one of the clusters, calculating similarity scores between query instances and each of the representative instances, using the similarity metric, producing a real, non-negative root for each similarity score within a predefined interval, using each root, determining the representation in the list of tables of each respective query instance;

determining a set of training data falling within a predetermined range of the similarity results produced from the predetermined similarity metric; and displaying a notification upon identifying the test data falling outside previously identified clusters.

20. The method of claim 19 wherein the profiling of the historical data comprises partitioning the historical data into a set of clusters such that each of the clusters represents a specific behavioral pattern of the user, and wherein the evaluating of the similarity results comprises labeling the test data as normal if the pattern of the test data matches the profile of the historical data for at least one of the clusters and otherwise labeling the test data as intrusive.

21. The method of claim 20 wherein the comparing of the test data with the profiled historical data comprises comparing the test data with representative instances of the clusters in the set of clusters.

* * * * *